Figure 1:
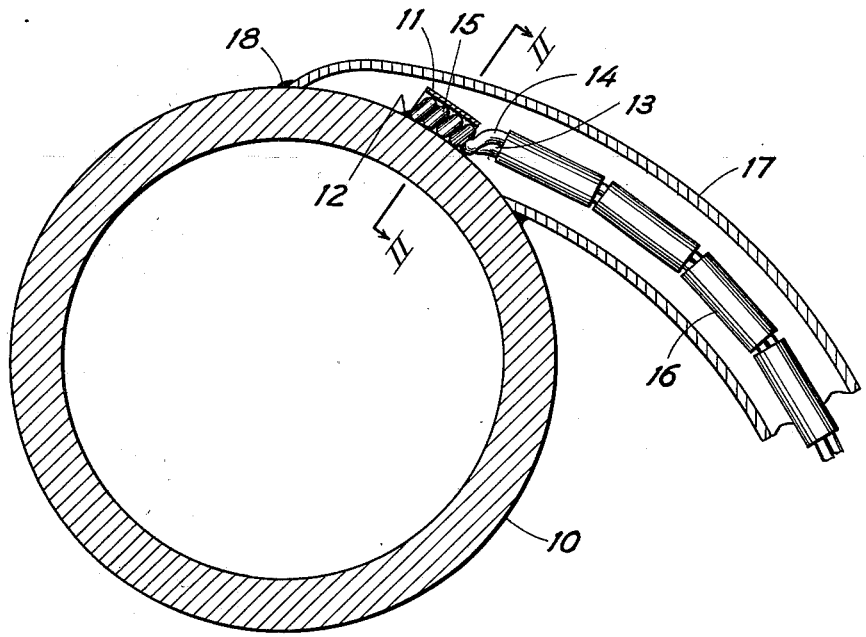

Inventors
George A. Davidson
Orval E. Liddell
Carlos N. Hine
Gaylord W. Shannon

By: *[signature]*
Attorney

Patented July 28, 1936

2,048,681

UNITED STATES PATENT OFFICE 2,048,681

THERMOCOUPLE SHIELD

George A. Davidson, El Segundo, Orval E. Liddell, Los Angeles, Carlos N. Hine, Santa Monica, and Gaylord W. Shannon, Los Angeles, Calif., assignors to Standard Oil Company of California, San Francisco, Calif., a corporation of Delaware Application May 14, 1935, Serial No. 21,432

6 Claims. (Cl. 136—4)

This invention relates to high temperature measuring equipment, and particularly to a shield for thermocouples which may be attached to heated bodies, such as tubes in oil heaters, to protect the same from deterioration due to radiant heat, corrosive gases and physical damage.

Heretofore, thermocouples in services of this type have been held to the heated body whose temperature is to be determined by being welded thereto, or by other equivalent means.

In our invention, a tube or shield of corrosion and temperature resistant material is placed over the thermocouple wires and junction and is securely welded at its juncture with the body to make a tight joint therewith, in order to prevent rapid deterioration or carbon absorption of the thermocouple wires that would otherwise occur.

It was found, however, that even with a perfectly gas-tight shielding tube, thermocouple wires and their junctions would sometimes be subject to rapid and erratic deterioration. Inasmuch as the proper operation and the safety of an entire heater unit, particularly one with alloy tubes having a brittle or "hot short" range, is dependent upon an accurate and continuous knowledge of tube wall temperatures, it will be appreciated that such deterioration is not only aggravating but dangerous.

It was discovered, after numerous tests, that the presence of foreign materials, and particularly carbon or carbon forming materials, either solid or gaseous, inside the shield, or upon the thermocouple wires or junction, or at any point exposed to both the wires and the source of heat, was apparently the chief source of trouble.

It was also determined that, if the means for securing the junction to the tube were not in direct or conductive contact with the enclosing shield, the accuracy of temperature indication was much improved.

It is, therefore, an object of this invention to provide an improved means of securing a temperature responsive element such as a thermocouple to a heated object, such as a tube in an oil heater, and effectively shielding the same, which will result in a permanent or at least long-enduring installation.

Another object is to provide an improved form of attaching means to secure the thermocouple junction to a tube or the like, that will result in an accurate indication of the temperature of said tube.

Another object is to provide an improved technique or method of applying a shielded thermocouple to a heated body.

These and other objects and advantages will be more fully apparent from the following description and from the accompanying drawing, which forms a part of this specification, and illustrates a preferred embodiment of this invention.

In the drawing, Figure 1 is a vertical sectional view of a shield and thermocouple securing means according to this invention.

Figure 2:
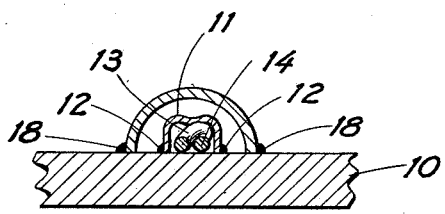

Figure 2 is a sectional view on line II—II of Figure 1, and to an enlarged scale, showing the arrangement of a clip for the junction, and a shield therefor.

Referring to the drawing, the numeral 10 indicates a metal tube, such as is commonly used in tubular oil heaters, and which may attain a temperature approximating redness or in the neighborhood of 1000°–1200° F. At the desired point on the surface of the tube, and usually on the side which is more or less shielded from direct radiant heat from the fire, is secured an arched, heat resisting alloy clip 11, as by welding at 12. The surface of the tube 10 at this point is previously ground or sand-blasted thoroughly, to remove any scale, rust, oil, coke, soot, or foreign material, particularly that which may be carbonaceous in nature or which may form solid or gaseous carbon upon heating.

The thermocouple wires 13 and 14, which may be of any suitable materials such as the metallic alloys sold under the trade names "Chromel" and "Alumel", are assembled in the usual manner, with the conventional junction 15 and the porcelain insulators 16, extreme care being taken to insure that no oil, grease, or foreign material is permitted to be upon them during fabrication or to contaminate them thereafter. The outer shield 17, which may be a heat resisting alloy tube, is thoroughly brushed out and is preferably washed and steamed to be certain that no grease, oil, or dirt will be in that portion nearest the juncture with tube 10.

The twisted junction 15 of the thermocouple is inserted in the clip 11, and the latter is carefully peened down to hold the junction securely. Shield 17 is then secured in place over the clip 11 and out of contact therewith, and is preferably welded to tube 10 as at 18, to form a gas-tight joint. It is advantageous to test this joint as with air pressure and soap suds, to insure its being truly gas tight.

No special precautions need be taken with closing the outer end of tube 17, which usually extends out of the furnace chamber to the atmosphere. The essential provision appears to be in the exclusion of solid or gaseous carbonaceous or carbon forming materials from the thermocouple junction and the interior of the shield immediately adjacent thereto.

A further advantage of this construction is the relation between the clip 11 and the thermocouple secured thereby, to the shield 17, as there is no direct contact therebetween and consequently no appreciable transfer of heat by conduction from the shield to the thermocouple or in the opposite direction. The shield 17 being of light material and not cooled by internal fluid as is tube 10 will ordinarily be at the higher temperature. If contact is permitted, the thermocouple indication has been found to be inaccurate.

The practice of this invention in the manner indicated has resulted in increasing the effective life of thermocouples from a very few hours to many thousands of hours, and has greatly increased the accuracy of temperature indication.

Although a specific construction embodying this invention has been described and illustrated, it is to be understood that the invention is not limited to that specific device, and all such modifications and changes as come within the scope of the appended claims are embraced thereby.

We claim:

1. A temperature responsive assembly for a body exposed to high temperature furnace gases, comprising a thermally responsive element susceptible to deterioration by carbon absorption, means for securing said element to said body, means extending from said element to a point out of said furnace gases for conducting thereto the response of said element, and a gas-tight shield secured to said body and surrounding said element, those surfaces and means enclosed by said shield adjacent said element being clean and free from carbonaceous and carbon forming materials, said shield comprising a metal tube surrounding said response conducting means to a point outside of said gases.

2. A thermocouple assembly for a body exposed to high temperature furnace gases, comprising a metallic temperature responsive junction, means for securing said junction to said body, means forming a conductor extending from said junction to a point outside of said furnace gases for transmitting thereto the response of said junction, and a gas-tight shield secured to said body and surrounding said junction, those surfaces and means enclosed by said shield adjacent said junction being clean and free from carbonaceous and carbon forming materials, said shield comprising a metal tube surrounding said conductor means to a point outside of said gases.

3. A thermocouple assembly for a body exposed to high temperature furnace gases, comprising a pair of thermocouple wires terminating in a junction, means for securing said junction to said body, a pair of electric conductors leading from said junction to a point outside of said furnace gases, and a gas-tight shield secured to said body surrounding said means and said wires, those surfaces and means enclosed by said shield adjacent said junction being clean and free from carbonaceous and carbon forming materials, said shield comprising a metal tube surrounding said conductors to a point outside of said gases.

4. A thermocouple assembly according to claim 3 in which said means for securing said junction to said body is out of contact with said shield, to prevent direct conduction of heat therebetween.

5. A thermocouple assembly according to claim 3 in which said means for securing said junction to said body comprises a deformable clip welded to said body.

6. A thermocouple assembly for a body exposed to high temperature furnace gases, comprising a pair of thermocouple wires terminating in a junction, means for securing said junction to said body, and a gas-tight shield secured to said body and surrounding said means and said wires, said securing means for said junction being out of contact with said shield to prevent direct conduction of heat therebetween, said shield comprising a metal tube for said wires extending to a point outside of said furnace gases.

GEORGE A. DAVIDSON.
ORVAL E. LIDDELL.
CARLOS N. HINE.
GAYLORD W. SHANNON.